March 18, 1952  H. L. CHISHOLM, JR., ET AL  2,589,341
HYDRAULIC STEERING MOTOR AND SHIMMY DAMPNER
Filed Sept. 6, 1946  4 Sheets-Sheet 2

Inventors
Harry L. Chisholm, Jr.
George Farrell
Bernard E. O'Connor

March 18, 1952   H. L. CHISHOLM, JR., ET AL   2,589,341
HYDRAULIC STEERING MOTOR AND SHIMMY DAMPNER
Filed Sept. 6, 1946   4 Sheets—Sheet 4

Inventors
Harry L. Chisholm Jr.
George Farrell
Bernard E. O'Connor
Attys

Patented Mar. 18, 1952

2,589,341

UNITED STATES PATENT OFFICE 2,589,341

HYDRAULIC STEERING MOTOR AND SHIMMY DAMPENER

Harry L. Chisholm, Jr., George Farrell, and Bernard E. O'Connor, Buffalo, N. Y., assignors to Houdaille-Hershey Corporation, Detroit, Mich., a corporation of Michigan Application September 6, 1946, Serial No. 695,112

16 Claims. (Cl. 121—41)

This invention relates to an improved device especially suitable for steering and shimmy control of the steering wheels of airplane landing gears or the like, and more particularly control of the trailing or nose wheel of three wheel landing gears.

The invention is concerned with various improvements over and in addition to a steering motor and shimmy dampener of the type disclosed in the patents issued to one of the applicants herein, Harry L. Chisholm, Jr., No. 2,372,710, issued April 3, 1945, and 2,383,773, issued August 28, 1945.

In the use of a steering motor and shimmy dampener of this type in an airplane, for example, a vaned piston is operable in hydraulic working chambers and is connected with the wheel to be steered and controlled. A control valve structure operable from the pilot's seat in the associated airplane controls the direction of flow of hydraulic fluid under pressure to the piston vanes in said working chambers to rotate the piston and thereby turn the steering wheel in the desired direction. Appropriate connections are afforded with a source of hydraulic pressure fluid also under control from the pilot's seat in the airplane, and with a discharge line for carrying off spent pressure fluid.

When the pressure fluid is shut off, the device automatically functions as a shimmy damper, inter-conecting piston supported control valve structure cooperating to check the flow of hydraulic fluid between the working chambers to dampen shimmy of the associated wheel. In this connection, it may be stated, that the device operates as a filled hydraulic system, and safety check valve means function, whenever the hydraulic pressure fluid supply is cut off or the pressure drops below operating value for steering, thus maintaining the device filled with the hydraulic fluid for efficient operation as a shimmy dampener.

An important object of the invention is to provide in a hydraulic steering motor and shimmy dampener of the kind indicated positive sealing and substantially wear-free main control valve means.

Another object of the invention is to provide novel poppet valve control mechanism which is particularly suitable for controlling the direction of hydraulic pressure fluid flow in a hydraulic steering motor device.

Still another object of the invention is to provide a hydraulic steering motor control valve mechanism having an unusualy high safety factor and positive operating characteristics.

A further object of the invention is to provide in a hydraulic steering motor for steering wheels operating means enabling visual indication of the steering position of the wheel.

Another object of the invention is to provide in an improved hydraulic steering motor and shimmy dampener advantageous means for effecting replenishment of the hydraulic fluid in order to maintain a filled system within the device.

It is also an object of the invention to afford improved means for venting air from the hydraulic system of a hydraulic steering motor and shimmy dampener.

A still further object of the invention is to provide simple and effective thermal pressure relief for hydraulic steering motor and shimmy dampener.

Yet another object of the invention is to provide a hydraulic steering motor and shimmy dampener structure in which certain parts of relatively small mass subject to relatively high hydraulic pressures are appropriately relieved from excessive deflection due to the hydraulic pressures.

A still further object of the invention is to provide a novel steering motor and shimmy dampener which is readily adaptable in construction to meet various requirements as to function and available working space and which is especially suitable for highly pressure sensitive operation.

These and other objects, features and advantages of the present invention will be readily apparent from the following detailed description of certain preferred embodiments of the invention, taken together with the accompanying four sheets of drawings, wherein.

A hydraulic steering motor and shimmy dampener embodying the features of the present invention may be housed as a unit within an elongated tubular cylinder 15 (Fig. 1) having adjacent to its upper and lower ends laterally outwardly projecting attachment ears 17 (Fig. 10) and 18 (Fig. 5), respectively, by which the device is adapted to be secured to the cylinder of an oleo strut or like mounting of an airplane steering wheel. Details of the airplane and wheel structure, connecting linkage, hydraulic conduits, control shafting, etc., have been omitted in the present instance since they are well known. If more detailed information relative thereto is desired, reference may conveniently be had to the aforesaid Chisholm Patents 2,372,710 and 2,383,773 wherein the details disclosed are sufficiently comprehensive to afford an understanding of the application of the device disclosed herein to a comparable wheel structure.

Figure 1:
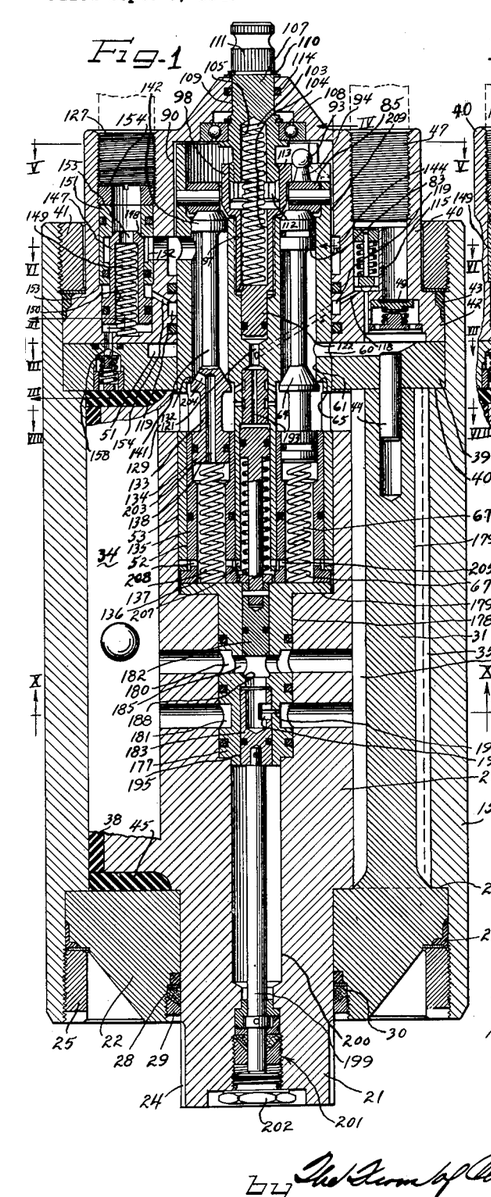
Figure 1 is a vertical sectional view, more or less conventionalized, through a hydraulic steering motor and shimmy dampener unit embodying the features of the present invention.

Rotatably mounted within the cylinder 15 is a vaned piston 20 which has a shaft 21 extending in slidably bearinged relation through a bottom closure flange or wall member 22 fixedly resting against an outwardly or downwardly facing internal shoulder 23 spaced inwardly from the lower end of the cylinder. On the outwardly projecting portion of the piston shaft 21 is formed a series of longitudinal serrations 24 for interlocking attachment thereto of operating lever structure for connection with the wheel to be steered.

As shown, the lower closure flange 22 is of relatively massive structure and thoroughly capable of withstanding substantial hydraulic pressure without deflection. For convenience the outer end thereof is of generally conically tapered shape in order to accommodate a securing ring nut 25 threaded into the end of the cylinder 15 and driving toward the contiguous margin of the closure flange 22 whereby to clamp the latter against the shoulder 23 and at the same time compress packing 27 to afford a fluid tight joint.

A substantially fluid tight joint between the rotary piston shaft 21 and the internal bearing wall of the closure flange 22 is afforded by packing 28 compressed by a ring nut 29 encircling the shaft 21 and threaded into an annular recess or rabbet groove 30 at the outer end of the bearing wall.

Figure 8:
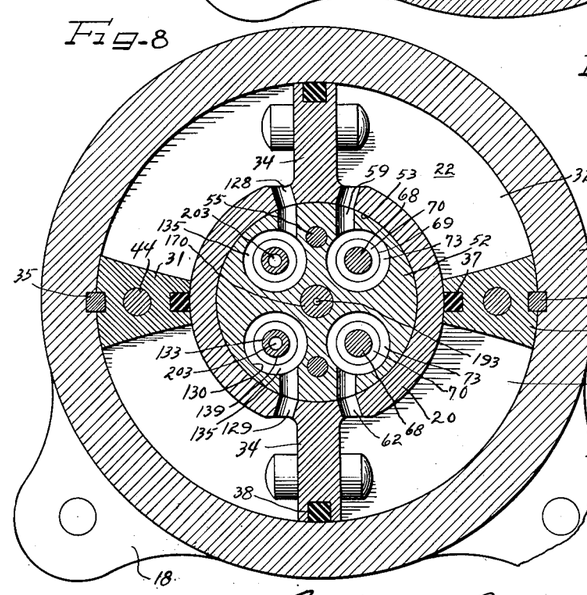
Figure 10:
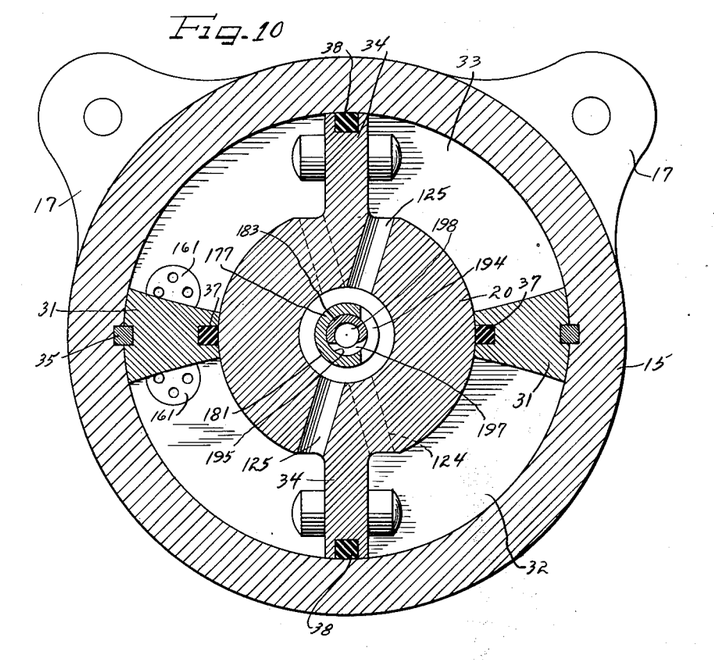
Figure 10 is a transverse, sectional, detail view taken substantially along the line X—X of Figure 1.

The closure flange member 22 carries a pair of integral longitudinally inwardly extending stationary vanes or abutment members 31. These are preferably identical in structure and disposed on diametrically opposite sides to fit relatively snugly against the internal wall of the cylinder 15 and to cooperate in relatively slidable relation with the periphery of the piston 20 (Figs. 1, 8 and 10).

The abutments 31 cooperate with the piston 20 to divide the interior of the cylinder 15 into a pair of hydraulic working chambers 32 and 33. Each of the working chambers 32 and 33 is divided by longitudinal and diametrical integral vanes 34 extending radially from the piston 20.

Keys 35 lock the abutments 31 to the cylinder 15. Packing or sealing strips 37 afford a wiping liquid seal between the abutments and the piston 20. Sealing or packing strips 38 provide a wiping liquid seal between each of the vanes 34 and the wall of the cylinder.

A closure for the opposite or upper end of the cylinder 15 is afforded by a flange or closure plate 39. In the present instance, the closure plate flange 39 is preferably a relatively thin plate which supports a head structure 40 and is received against an annular outwardly or upwardly facing internal shoulder 40a formed in the internal cylinder wall 15 in preferably a plane with the adjacent ends of the abutments 31 and the end of the piston 20. Securing the closure member 39 and the head 40 in place is a ring nut 41 threaded into the upper end of the cylinder 15 and driving against a lateral flange 42 on the head whereby to clamp the flange 42 and the margin of the closure member 39 against the shoulder 40a. Packing 43 compressed by the ring nut 41 affords a liquid tight joint between the cylinder wall and the closure member and head assembly.

A rigid connection between the closure plate member 39 and the adjacent ends of the abutments 31 is afforded by connecting pins or dowels 44.

Substantially liquid tight sliding joints between the opposite ends of the vanes 34 and the closure members 22 and 39, respectively, are afforded by packing or sealing strips 45 and fitted into the vane ends.

According to the present invention, means are provided for the controlled admission of hydraulic fluid selectively to the working chambers 32 and 33 to drive the piston vanes 34 for effecting rotary steering movement of the piston 20. Hydraulic pressure fluid is adapted to be delivered from any suitable source under the requisite pressure into an inlet 47 provided in the head 40. From the inlet, the pressure fluid passes through a vertical passage 48 and past a spring-biased disk-type check valve 49 into a lateral conducting passage 50 formed in the outer face of the closure plate 39. Thence, the pressure fluid passes into an annular distribution channel 51 also formed in the outer face of the closure plate 39, surrounding a cylindrical control valve plug 52 extending in slidable bearing relation axially through the closure plate.

It may be noted that since the closure plate 39 is subjected to substantially equal hydraulic pressure on both sides while acting as a steering motor a virtually balanced pressure condition prevails and frees it of forces that might tend to deflect the plate axially. Hence, the plate can be made fairly thin and thus conserves space in the assembly.

The control valve plug 52 is of elongated cylindrical form and the inner or lower portion is secured fast within an axial bore 53 provided therefor in the upper end of the piston 20. The outer or upper portion of the plug extends upwardly in sliding, bearing relation into a bore 54 in the head 40. Rigid assembled relation of the control valve plug 52 and the piston 20 is effected by means of screws 55 extending longitudinally through the plug into the piston.

Pressure fluid communication between the annular distribution channel 51 and the working chambers 32 and 33 is afforded by a system of bores, passages and ports in the valve plug 52 and the piston 20. For this purpose, a radial port 57 (Fig. 7) opens inwardly from the channel 51 into the valve plug 52 and communicates with a vertical bore 58 affording a passage communicating with a lateral delivery port 59 (Fig. 8) which opens adjacent the top of the piston 20 and closely adjacent to one side of the vane 34 within the working chamber 32. Another radial port 60 opens inwardly into the plug 52 and affords communication between the distribution channel 51 and the working chamber 33 by way of a vertical bore 61 affording a passage communicating with a lateral delivery port 62. The latter opens into the working chamber 33 at the top of the piston 20 closely adjacent to the vane 34 therein and on the same side of such vane as the port 59 with respect to its companion vane 34. Thus, it will be apparent from Figure 8, that hydraulic pressure fluid entering the working chamber 32 by way of the delivery port 59 will work between the opposing faces of the confining abutment 31 and the vane 34 to drive the piston 20 counterclockwise as viewed. On the other hand, the pressure fluid delivered through the port 62 into the working chamber 33 will act to drive the piston 20 clockwise.

In order to admit the hydraulic pressure fluid selectively to either of the working chambers 32 or 33 for steering purposes, the pressure fluid passages 50 and 51 are provided with control valves 63 and 64, respectively. By preference, these are poppet valves which are adapted to be operated by the pilot of the airplane with which the device is associated. To this end, the poppet valves 63 and 64 are disposed in spaced relation in a straight line on a chord of the valve plug 52 and each is preferably urged upwardly against a respective seat 65 located intermediate the inlet and delivery ports of its pressure fluid bore by a coiled expansion spring 67 of stronger bias than the maximum opposing line pressure of the hydraulic fluid.

Each of the poppet valve members 63 and 64 is provided with a base or stem 68 of reduced diameter extending past the respective delivery ports 59 and 62 and terminating in a cylindrical base 69 of enlarged diameter and formed with an upwardly directed pressure face 70 opposing a downward pressure face 71 on the valve member and of equal area. A bottom face 72 on the base 69 is abutted by the upper end of the cooperating expansion spring 67. Affording a close sliding fit with the base 69 is a cylindrical guide sleeve 73 providing a lower reduced diameter axial bore 74 serving as a loose guide for the spring 67 and fitting within a lower enlarged diameter portion of the pressure fluid bore 58 or 61 below the delivery port 59 or 62, respectively. A ring packing 75 received within a groove 77 in the cylindrical base 69 assures a fluid tight seal between the bearing surfaces of the base member and the bearing sleeve 73. To assure a fluid tight joint between the bearing sleeve 73 and the wall of the lower enlarged portion of the bore 58 or 61, respectively, packing material is preferably disposed between the interfaces thereof, as indicated at 78.

Each of the poppet valves 63 and 64 is provided with a cylindrical actuating head 79 at the upper end of an integral reduced diameter stem 80. The head 79 is of a diameter to fit in relatively close sliding bearing relation within an upper extension of the respective pressure fluid bore in which it is housed. A ring packing 81 in an intermediate annular groove 82 encircling each of the heads 79 affords a substantially leak-proof fluid seal. The head 79 has a lower face 83 which is preferably of substantially the same exposed area as the area of the opposing respective valves 63 and 64, and substantially the same area as the upper face 70 of the base 69. An upper face 84 on the head 79 is preferably of substantially the same area as the lower face 72 of the base 69 of the poppet valve structure.

Figures 4, 5:
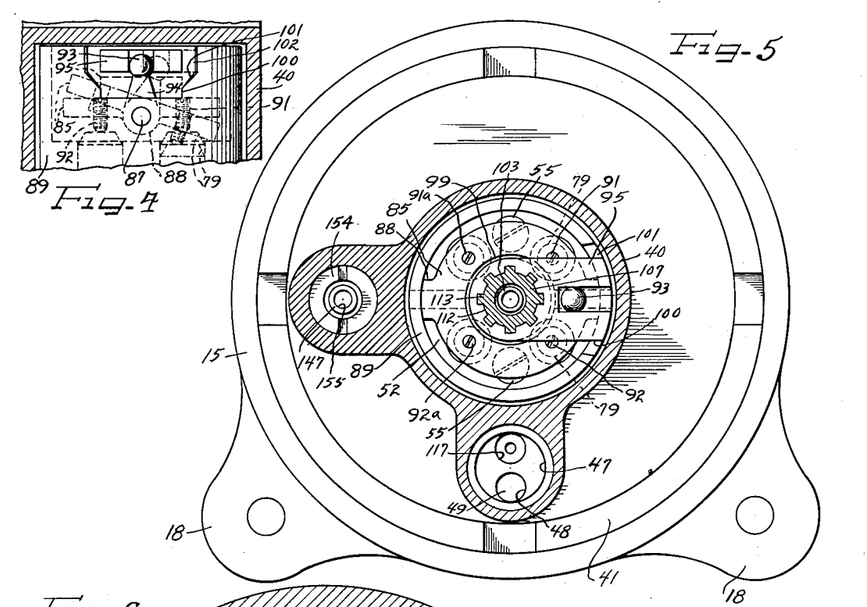
Figure 4 is a slightly enlarged, fragmentary vertical sectional detail view taken substantially along the line IV—IV of Figure 1.
Figures 5, 6, 7 and 8 are transverse sectional detail views taken substantially along the lines V—V, VI—VI, VII—VII and VIII—VIII, respectively, of Figure 1.

Acting against the respective upper faces 84 of the poppet valve heads 79 and adapted to urge the pressure fluid controlling poppet valves 63 and 64 selectively slidably axially in opposition to the bias of their respective springs 67 are actuating means comprising, in the present instance, a rocker plate 85 (Figs. 1, 4 and 5). This plate 85 overlies the poppet valve heads and is rotatably mounted on a horizontal diametrical axis midway between the poppet valves 63 and 64 by means of pins 87 extending radially from trunnions 88 and journaled in an upstanding annular flange 89 at the upper end of the valve plug 52. This flange 89 projects into a housing chamber 90 in the upper end of the head 40. The axis of the rocker plate 85 extends between the axes of the poppet valves 63 and 64 so that when the rocker plate is rocked toward the poppet valve 63 an axially adjustable abutment screw 91 will act upon the head face 84 of such valve and depress the valve to unseat it. Tilting of the rocker plate in the opposite direction causes an adjustable abutment screw 92 carried thereby to engage and depress the head 79 of the valve 64. Adjustment of the abutment screws 91 and 92 will properly compensate for any inaccuracy or lack of uniformity that may show up in the actuating relationship of the rocker plate to the poppet valves after completion of the poppet valve assembly.

Figure 6:
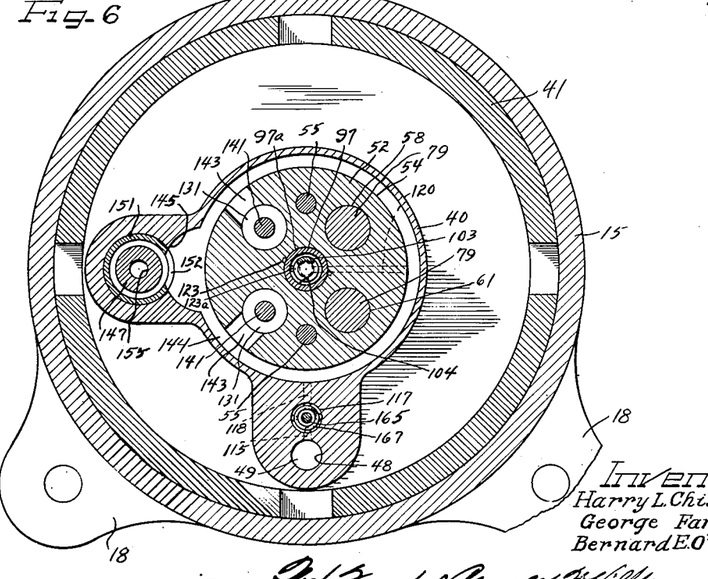

For actuation thereof, the rocker plate 85 includes means such as an integral tilting ball or knob 93 carried by an upstanding rocker arm 94 and disposed directly over the rocker axis of the plate. For actuating the rocker arm ball 93 means such as a reciprocable and oscillatable fork 95 engages the same and is carried by or integral with a rotatable and reciprocable plunger 97 projecting slidably in an axial bore 97a in the valve plug 52 (Figs. 1 and 6). In the present instance, the upper end of the plunger 97 which carries the fork 95 is formed as an enlarged head 98 which extends downwardly through a central clearance aperture 99 in the rocker plate. The fork 95 is formed flat, at least on its under face, to lie on top of the rocker plate and retain it in a neutral horizontal position as shown in the broken outline position in Figure 4. The fork 95 is formed with parallel sides to be received within a locking slot 100 formed for this purpose in the upstanding marginal flange 89 of the valve plug. While the fork 95 is held in the locking slot 100 it cannot be oscillated and thereby serves to lock the rocker plate in neutral position.

Above the base of the locking slot 100, a distance somewhat less than the thickness of the fork 95, the slot widens out in the form of oblique cam surfaces 101 at the respective opposite sides of this slot to a predetermined width defined by vertical limit edges 102 which define the range of oscillation of the fork in swinging the rocker arm ball 93, thereby rocking the plate 85.

By preference the fork-carrying plunger 97 is positively urged axially downwardly to maintain the rocking fork 95 normally in the rocking-plate locking position within the slot 100, and means are provided for unlocking the fork 95 by raising the plunger 97 through admission of the hydraulic pressure fluid to the unit when steering action thereof is to be effected. For this purpose, a coiled expansion spring 103 is seated within an axial spring pocket bore 104 within the plunger 97 and is held under compression within a spring pocket bore 105 in a coaxially disposed operating shaft 107. The latter is mounted rotatably by an encircling ring bearing 108 within an axial bore 109 provided therefor through the top of the head 40. A split locking ring 110 provides a retaining collar for the operating shaft 107 at the base of a serrated head 111 by which the operating shaft is adapted to be coupled to an operating lever, shaft or arm under the control of the airplane pilot.

A continuing operational connection between the fork head 98 and the operating shaft 107 is maintained through the medium of meshing spline teeth 112 and 113 (Figs. 1 and 5), in the head and on the stem, respectively. Packing 114 about the operating shaft 107 affords a fluid tight relationship between the bearing surfaces of the shaft and the head 40.

Until hydraulic pressure fluid is introduced into the unit, it will be observed that the compression spring 103 will operate to hold the fork 95 depressed, and thereby also maintain the operating shaft 107 locked against rotation relative to the valve plug 52. However, when the hydraulic pressure fluid it introduced through the inlet 47, enough of the pressure fluid is by-passed through a small port 115 within the inlet passage 46 (Figs. 1 and 6), a check valve chamber 117, a lead off duct 118, an annular distribution channel 119 and a delivery duct 120 to an axial passage 121 (Figs. 1 and 7) opening into the lower end of the plunger guide bore 97a which is preferably of somewhat reduced diameter and slidably accommodates an axial guide piston finger 122 at the lower end of the plunger 97. Thus, the hydraulic pressure fluid acts upon the lower end of the piston finger 122 to drive the plunger 97 axially outwardly against the bias of the compression spring 103 and lifts the rocker fork 95 out of the locking relation in the locking slot 100 to clear the fork for tilting of the rocker arm 94. One or more pressure relief vent grooves 123 may be formed in the wall of the plunger bore 97a, leading from the shoulder above the reduced diameter portion of the bore to the rocker plate chamber space at the upper end of the bore. Escape of pressure fluid in either direction along the plug 52 from the channel 119 is prevented by appropriate packing or sealing means, as shown. A bore 123a vents bore 104.

With the hydraulic pressure fluid acting to release the rocking fork 95, the unit is in condition for selectively admitting the hydraulic pressure fluid to either the working chamber 32 or the working chamber 33 by rotating the operating shaft 107 to swing the rocking fork 95 to rock or tilt the rocker plate 85 in either selective direction. If the rocker plate 85 is actuated to unseat and open the poppet valve 63, hydraulic pressure fluid is admitted by way of the delivery port 59 to the working chamber 32. The pressure fluid passes from the pressure side of the chamber 32 to the diametrically opposite supplementary pressure side of the working chamber 33 by way of a cross duct 124 (Figs. 1 and 10) extending transversely through the piston 20. Likewise, when the poppet valve 64 is opened, hydraulic pressure fluid delivered to the chamber 33 by way of the delivery port 62 goes by way of a cross duct 125 from the working chamber 33 to the diametrically opposite supplementary pressure side of the working chamber 32. Thus, the hydraulic pressure fluid is applied in balanced relation to the diametrically opposite portions of the working chambers 32 and 33.

At the same time that hydraulic pressure fluid is admitted to either of the working chambers 32 or 33, the hydraulic fluid is displaced from the respective non-pressure sides of the working chambers and is conducted through a valve-controlled displacement or exhaust circuit to a displacement fluid outlet 127 for return to a sump or other receptacle for the hydraulic fluid. For this purpose, displacement fluid ports 128 and 129 (Fig. 8) open adjacent to the upper end of the piston 20 and through the wall of the piston and extend into the valve plug 52 from the working chambers 32 and 33, respectively, at the opposite sides of the vanes 34 from the pressure fluid delivery ducts 59 and 62. Each of the displacement fluid ports 128 and 129 communicates with a respective vertical poppet valve bore 130 companion to the adjacent pressure fluid controlling poppet valve structure and accommodating a substantially frusto-conical poppet valve 131 in each instance of identical construction and adapted to be actuated simultaneously with the companion pressure fluid controlling poppet valve 63 or 64.

Each of the displacement fluid poppet valves 131 is adapted for seating in fluid sealing relation against a valve seat 132 afforded by a slight reduction in the diameter of the upper portion of the poppet valve bore 130 immediately above the respective displacement fluid ports 128 and 129. A reduced diameter coaxial base stem portion 133 extends downwardly from the poppet valve to afford a clearance groove or space with relation to the mouth of the companion displacement port and terminates in an enlarged cylindrical guide base 134 which is slidingly bearinged in the upper end of a sleeve 135 fitted into the lower enlarged diameter portion of the bore 130. The lower portion of the sleeve 135 has therein an axial bore 136 for a coiled compression spring 137 which bears against a lower face 138 on the cylindrical base 134 to bias the valve normally against its seat 132. An upper face 139 on the cylindrical base 134, and an opposing lower face 140 (Fig. 2) on the valve member 131 are of substantially the same area so as to afford a balanced or equalized fluid pressure condition.

Extending axially upwardly from the poppet valve 131 is a reduced diameter head stem 141 which terminates at its upper end in a cylindrical head 142 which is slidably guided in the upper end of the poppet valve bore 130 and is engaged axially with an abutment screw 91a or 92a as the case may be, in the rocker plate 85.

Figure 2:
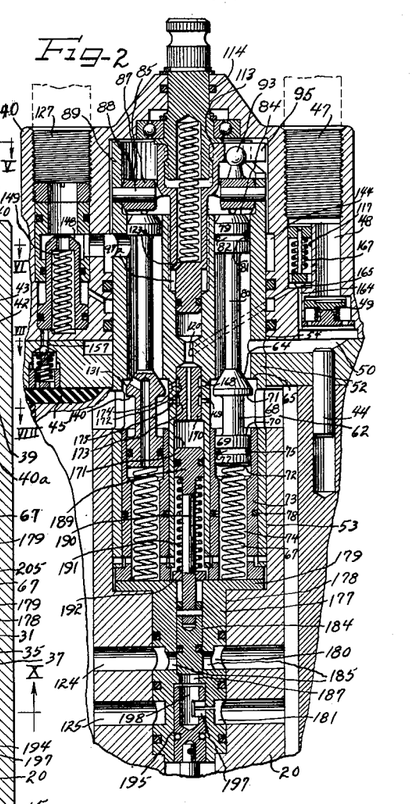
Figure 2 is a fragmentary vertical sectional view taken in substantially the same plane as Figure 1 but showing various parts in respective positions thereof assumed during operation of the unit as a steering motor.

As illustrated in Fig. 2, the displacement poppet valve 131 which is companion to the pressure fluid controlling poppet valve 63 or 64, as the case may be, is depressed in opposition to its biasing spring 137 simultaneously with the pressure controlling poppet valve. Hence, when hydraulic pressure fluid is admitted into the unit for driving the piston 20, simultaneous displacement relief is afforded for the non-pressure sides of the working chambers 32 and 33. Each of the displacement valve bores 130 has a discharge port 143 (Figs. 1 and 6) leading therefrom adjacent the upper end into an encircling displacement fluid channel 144 in the surrounding wall of the head 40. Leading from the displacement channel 144 is a discharge port 145 which opens into the outlet 127. Equalized displacement from the working chambers 32 and 33 is effected through the cross-ducts 124 and 125. By having the opposing faces of the displacement poppet valve 131 and the head 142 of substantially the same effective area, fluid pressure thereon is equalized.

By preference, the outlet 127 is provided with an automatic control valve 147 which may be of the plunger type and urged against a valve seat 148 outwardly of the port 145 by a coiled expansion spring 149. This spring seats at its lower or inner end against the closed bottom end of a downward extension within the head 40 of the bore providing the displacement outlet 127. The upper end of the spring 147 extends upwardly within an axial pocket 150 provided therefore within the valve plunger 147. The lower end of the valve plunger 147 is slightly enlarged to afford a guide bearing and limit structure slidably disposed within the lower end of the outlet bore 127. The upper reduced end portion of the valve plunger 147 is slidably bearinged in the lower portion of a sleeve 151 formed with a port 152 in registration with the pressure relief port 145. The valve seat 148 is formed by a reduction in diameter of the interior of the sleeve 151 above the port 152. Precautions against fluid leakage past the valve plunger 147 or the sleeve 151 are taken by the provision of appropriate packing as shown.

The sleeve 151 is held to an outwardly facing shoulder 153 within the outlet bore 127 below the port 145 by a ring nut 154, and the lower enlarged guide portion of the valve plunger 147 is normally in spaced relation to the inner end of the sleeve so as to afford a space which communicates by way of a duct 154 with the hydraulic pressure fluid channel 119. Thus, upon the introduction of hydraulic pressure fluid into the unit, the plunger valve 147 is quickly displaced from its seat 148 by action of the pressure fluid on the upper face of the enlarged plunger base in opposition to the bias of the spring 149 (Fig. 2). This unseated condition is then maintained as long as hydraulic pressure fluid is delivered to the unit so as to have the displacement fluid circuit open under the control of either of the displacement poppet valves 131. However, once the hydraulic pressure fluid supply is shut off, automatic plunger valve 147 will immediately close the displacement outlet 127 and thus obviate undesirable back pressure or resurgence of displaced fluid.

Figure 3:
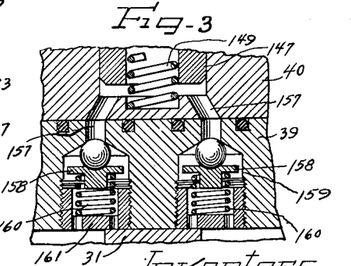
Figure 3 is a fragmentary, enlarged sectional view taken substantially along the line of III—III of Figure 1.
Figure 11:
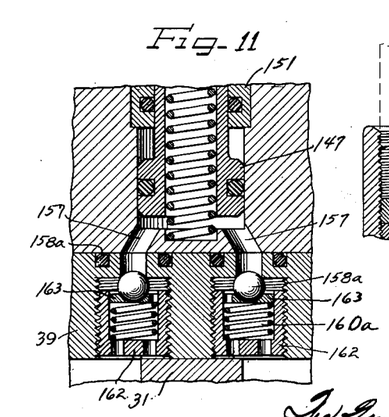
Figure 11 is a fragmentary, vertical, sectional view showing a modified form of replenishing valve structure.

Another function of the plunger control valve 147 is to afford a replenishing means for hydraulic fluid, by-passing the poppet valve assembly, to maintain the working chambers 32 and 33 completely filled when the unit is working merely as a vibration damper. For this purpose the plunger valve 147 is provided with an axial bore 155 through the end thereof opening into the spring pocket 150 therein and affording a replenishing fluid passage for hydraulic fluid introduced by way of the outlet 127 as a result of back pressure in the displaced fluid or by connecting the outlet with a hydraulic pressure fluid supply source, if desired. It is relatively convenient to maintain the fluid displaced during steering under sufficient head or back pressure to serve the replenishing purpose. Assuming that replenishment is to be effected by back pressure in the displaced hydraulic fluid, a pair of angular ducts 157 extending through the bottom of the head 40 and through the adjacent portion of the top closure plate member 39 are controlled by respective piston check valves 158 held seated at the upper ends of appropriate bore enlargements 159 by means of relatively light coiled expansion springs 160 carried in perforated cages 161 threadedly secured into the closure plate member 39 at opposite sides of one of the abutments 31 (Fig. 3). Replenishment of the unit is important in order to maintain a filled fluid circuit and avoid the formation of air pockets within the unit. It may be noted that the ducts 157 are so disposed as to be blocked by the base of the plunger valve 147 when the pressure fluid supply is live and the valve plunger is in the open valve position, thus avoiding any short circuiting of displaced fluid during steering operation (Fig. 2).

Where fluid replenishment is effected by introducing relatively high pressure hydraulic fluid by way of the outlet 127 through the outlet control valve plunger 147, it is desirable to use a pressure reducing type of control valve such as shown in the modification of Fig. 11. Therein ball valves 158a are urged against their seats by relatively strong respective coiled expansion spring 160a mounted within bottom-perforated cages 162a threaded into the top closure wall member 39 at each side of one of the stationary vanes 31, with ball retainer disks 163 holding the ball valves in place under the influence of the springs.

Should the temperature increase and thus cause the hydraulic fluid to expand and cause a rise in the internal pressure, while both the inlet and outlet ports and passages of the unit are closed, the excess volume of expanded liquid in the filled system of the device is adapted to bleed off slowly past the upper end of the piston 20 through the bearing bore in the upper closure plate 39 which accommodates the piston hub provided by the upwardly projecting portion of the valve plug 52. Thence, the surplus liquid leaves by way of the surrounding fluid channel 51 and the conducting passage 50 and discharges through a bleeder duct 164 by-passing the inlet check valve 49. In control of the bleeder duct 164 is a check valve 165 located within the by-pass chamber 117 and spring biased into normally closed condition by a relatively light coiled expansion spring 167. The bled-off fluid can escape out of the by-pass chamber 117 by way of the port 115 into the inlet passageway. In order to accommodate the expansion overflow, the pressure fluid inlet 47 is preferably depressurized during non-steering periods, as by venting to atmosphere.

Since it is important for the successful operation of the unit that all air be expelled therefrom, means have been provided for a positive discharge of air automatically during the operation of the device. To this end, small air bleeder ducts 168 and 169 lead from the pressure fluid control poppet valve chambers past a plug 170 disposed fast within an axial bore 171 and provided with a pair of annular grooves 172 and 173 registering with the ducts 168 and 169, respectively. Bleed off ports or ducts 175 and 176 lead off from the channels 172 and 173, respectively, and communicate with the displacement poppet valve bores or chambers. As the poppet valves 131 are alternately opened and closed during steering, the fluid velocity through the air bleeder ports or ducts, due to pressure differential between the working chambers 32 and 33, carries or blows off excess air out therethrough into the discharge or outlet portion of the hydraulic system.

While the device is being operated as a steering motor, it will, of course, function as a shimmy damper since the vanes 34 will resist any rapid displacement movements in the presence of the hydraulic pressure fluid. Since a completely filled condition of the hydraulic fluid is maintained in the system and by reason of the complete closing of the system by the poppet valves and various check valves during non-steering periods or in the event of failure of the hydraulic pressure fluid supply, the shimmy dampening function will persist.

In the closed condition of the unit, blow off displacement of the hydraulic fluid between the working chambers 32 and 33 must be accommodated for effective anti-castering or shimmy-damping control. To this end a valve structure is provided which although closing the opposite sides of each of the respective chambers against a direct transfer of displaced hydraulic fluid during steering operation, opens a path for metered transfer of displaced hydraulic fluid from one side of each chamber to the other side when operating merely as a shimmy-damper. Such structure includes a spool 177 fixedly disposed axially in intersecting relation to the fluid equalizing transverse passages 124 and 125 in the piston 20. A reduced diameter bore 178 leading downwardly from the valve unit plug bore 53 accommodates the spool 177. A lateral flange 179 at the upper end of the spool is fixedly secured between the lower end of the plug 52 and the shoulder surrounding the upper end of the bore 178.

To accommodate continuously free equalizing displacement of hydraulic fluid between diametrically opposite portions of the working chambers, by way of the passages 124 and 125 which it intersects, the spool 177 is formed with annular grooves 180 and 181, respectively, connecting the portions of the intersected equalizing passages (Figs. 1 and 10). Thus, during steering operations of the device, hydraulic pressure fluid or displacement fluid, as the case may be, can flow freely between the diametrically and cooperative opposite portions of the working chambers. During such steering operations, of course, there is a through circuit operating from the pressure fluid inlet 47 and out through the outlet 127, as hereinbefore described. Therefore, direct displacement of the hydraulic fluid from one portion of one of the working chambers to the other portion thereof is to be avoided.

During merely the shimmy-damping operation of the unit, while the unit is not being pressurized by the introduction of hydraulic fluid under pressure, and is closed against any substantial escape of the hydraulic fluid, controlled displacement between the respective portions of each of the working chambers 32 and 33 must be provided for. This must be, so that during oscillations of the piston 20 fluid can be displaced from the two decreasingly formed high pressure sides of the working chambers into the two respective increasingly formed low pressure sides of the chambers. To this end, the channeled spool 177 is provided with a control valve arrangement automatically responsive to the prevailing operating conditions within the unit. Such valve arrangement includes a live-pressure responsive plunger valve 182 and a displacement-flow metering valve 183.

The plunger control valve 182 is operable automatically in response to live hydraulic pressure fluid, to be driven from a normal inactive position as shown in Figure 1 axially slidably downwardly within an axial guide bore 184 in the spool 177 into closing relation to radial orifices 185 and an axial orifice 187 affording fluid communication between the displacement fluid passages 124 and 125. A shoulder 188 at the upper side of the axial orifice 187 affords a valve seat for the plunger valve 182 in its orifice-closing position.

Actuation of the plunger valve 182 is effected by a piston 189 axially reciprocable in a downward extension of the axial bore 171 in the lower portion of the valve plug 52 and connected to the valve plunger 182 by means such as an elongated piston rod or stem 190. A coiled expansion spring 191 working between the piston 189 and a retaining washer 192 seated upon the upper end of the spool 177 normally biases the plunger valve into the inactive or valve-opening position.

The upper or pressure face of the piston 189 opposes the lower end of the air blow-off or bleeder plug 170 so that the latter in effect provides a cylinder head for the piston. Live hydraulic pressure fluid for driving the piston 189 in opposition to the bias of the spring 191 is derived from the axial port 121 and passes through an axial passage 193 in the plug 170 to act upon the piston 189 as an incident to the initial introduction of live hydraulic pressure fluid through the inlet 47, and continues to maintain live fluid pressure throughout the steering operation of the device, thereby holding the plug valve 182 in its orifice-closing position until the live pressure fluid supply is discontinued, whereupon the plug valve snaps open under the influence of its biasing spring 191.

With the orifices 185 and 187 open, a two-way replenishing circuit is afforded between the transverse passages 124 and 125, the passage 125 having communication through a narrow chordal slot-like orifice 194 opening through the spool 177 at the annular groove 181 and communicating with an axial bore 195 within which the metering valve 183 in the form of a cylindrical plug is slidably mounted. Control of hydraulic fluid displacement flow between the axial orifice 187 and the radial slot orifice 194 is controlled by the degree of rotary registration of a chordal-slot orifice 197 in the plug valve 183 with the slot orifice 194. Full flow registration of an axial bore orifice 198 in the plug metering valve and the axial orifice 187 affords a flow path communicating with the slot orifice 197 and cooperating with the slot orifices for fluid metering control. Thus it will be seen, that displacement flow between the high pressure and low pressure sides of the working chambers during ordinary shimmy control operation of the unit is subject to relatively fine adjustment by the relative rotary disposition of the valve spool 177 and the plug valve 183, controlling the registration of the chordal slot orifices 194 and 197. Thereby optimum shimmy damping action of the unit is simply and easily attainable.

Means are preferably provided for manual adjustment of the rotary valve 183, herein comprising an actuating stem 199 extending in freely rotatable relation through a downward reduced diameter portion 200 of the axial spool bore through the piston shaft 21. At its lower end, the adjusting stem 199 extends through a retainer and packing gland assembly 201 and is accessible for rotary adjustment from the outer end of piston shaft 21 upon the removal of a closure plug 202.

Figure 7:
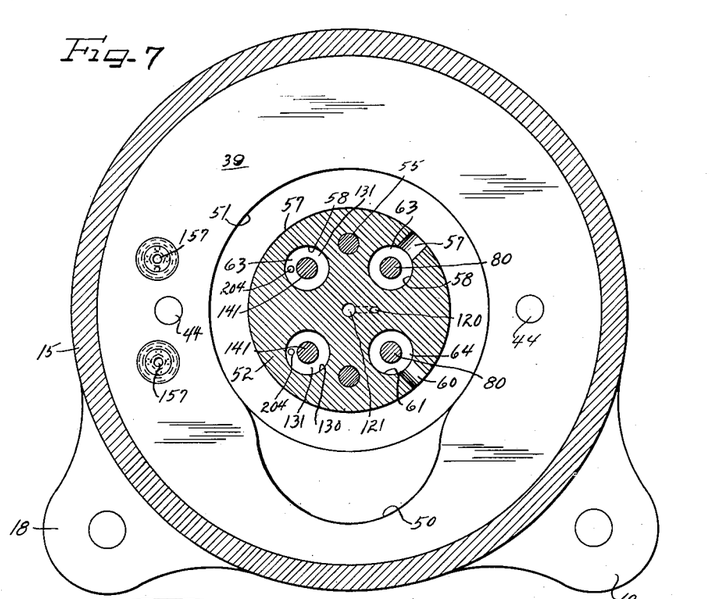

By having all of the various working spaces on the non-pressure sides or in back of the various hydraulic pressure fluid controlling or responsive valve structures relieved or vented to the discharge or outlet side of the hydraulic circuit of the unit, all pressure resistance to the free functioning of these structures is avoided. As is best seen in Figures 1 and 2, the return spring working chambers behind the pressure fluid controlling poppet valves 63 and 64 and behind the displacement controlling poppet valves 131, as well as the space behind the valve-operating piston 189 are all interconnected and appropriately vented or placed in communication with the outlet side of the hydraulic circuit through axial passages 203 extending up through the base 134 and base stem 133 of the respective displacement poppet valves 131 and communicating with respective lateral orifices 204 at the outer sides of these poppet valves (Figs. 1 and 7). Intercommunication with the passages 203 is effected through orifices 205 in the poppet valve sleeves 73, connecting with orifices 207 in the wall defining the lower end portion of the piston cylinder bore 171 and the latter connecting with orifices 208 in the poppet valve sleeves 135.

Insofar as the poppet valves is concerned, this also serves the useful purpose of equalizing the pressure at opposite ends of the poppet valve structure since the working space above the poppet valves is also in communication with the displacement or outlet side of the hydraulic circuit. To this end the annular groove 144 in the wall of the head 40 surrounding the valve plug 52 at the discharge port 152 communicates with the upper working space or chamber 90 through a clearance provided for this purpose between the wall of the head 40 and the upper portion of the valve plug 52 above the channel 144 and shown at 209. To implement this equalization of pressure at the opposite ends of the poppet valves, the opposite end faces thereof, namely, the faces at the top of the head in each instance and the lower end face of the base in each instance, are of substantially equal area.

Figure 9:
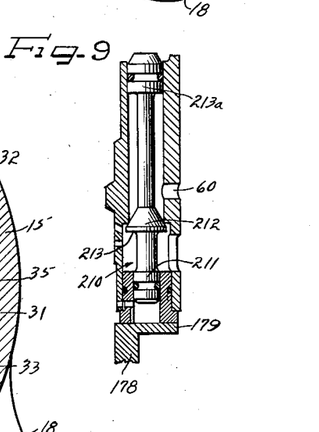
Figure 9 is a fragmentary, vertical, sectional detail view showing a modified form of poppet valve structure.

While the spring biased form of the poppet valve is preferred, if space limitations prevent the use of the poppet return springs, hydraulically unbalanced poppet valve structures 210 such as shown in the modification of Fig. 9 may be used. In this form of poppet valve, a guide base 211 of substantially reduced diameter as compared with the diameter of a valve portion 212 is provided so that the inner face of the valve proper, identified at 213, presents a substantially greater pressure area than the opposing upper face of the poppet base so that the internal fluid pressure of the device is effective after the hydraulic pressure supply has been discontinued to drive the valve 212 into closing relation to its seat. Since the effective pressure areas of the upper side of the valve 212 and the opposing or inner side of its guide head 213a are equal, live pressure fluid introduced therebetween has no driving effect but is neutralized. This leaves the valve always in an unbalanced condition responsive to the internal fluid pressure against the inner face 213. A feature of this unbalanced poppet valve structure resides in the sensible response or "feel" afforded thereby in the cockpit controls so that the pilot is made acutely conscious of the action of the steering motor. This modification may, of course, be used both in the pressure fluid controlling poppets and in the displacement controlling poppets, any necessary differences in structure as between the pressure fluid valves and the displacement valves conforming to those described in connection with the preferred embodiment of the invention.

In brief summary of the operation of the hydraulic steering motor and shimmy dampener, it will be remembered that in the absence of introduction of live pressure fluid by way of the inlet 47, the unit is in a state of hydraulic balance as a result of the completely filled condition of the unit and it functions as a shimmy damper, the various operating components being substantially in the relationship shown in Fig. 1. In this condition of the unit, any tendency of the mechanism connected to the end 21 of the piston shaft 20 to rotate the shaft is resisted by action of the piston vanes 34 on the fluid in the working chambers 32 and 33 of the device. However metered displacement of the hydraulic fluid for shock absorbing purposes, that is blow-off displacement between the working chambers 32 and 33 is accommodated by a valve structure 183. The slight yielding of the piston shaft 20 oscillatably thus permitted prevents shimmy from developing in the associated apparatus such as the airplane wheel controlled by the unit. Furthermore, the structure, including the control unit is saved from harmful effects of shocks imposed thereon in a manner tending to turn the associated wheel and thus the piston 20.

For steering purposes live hydraulic fluid is introduced into the unit through the inlet 47 and enters past the check valve 49 and through the passage 50, the groove 51 and the ports 57 and 60 into the valve housing or plug 52 in the head of the piston 20. There the pressure fluid is held against traveling further by the normally closed pressure fluid controlling poppet valves 63 and 64. At the same time pressure fluid traveling from the inlet by way of the port 115, the chamber 117, the passage 118 and the port 120 enters the passage 121 at the center of the valve housing 52 and promptly acts to shift the blocking plunger 182 to close the passage 187 between the fluid transfer cross ducts 124 and 125; and at the same time drives the plunger 97 axially outwardly to lift the rocker fork 95 out of the position wherein it locks the operating shaft 107 against rotation relative to the valve housing plug 52.

In the lifted position of the rocker fork its splined coupling with the shaft 107 permits the rocker fork to be oscillated selectively by the shaft 107 to tilt the rocker arm 94 and thereby the rocker plate 85 for actuating either of the poppet valves 63 or 64 to open the same simultaneously with its companion exhaust control poppet valve 131, as indicated in Fig. 2 thereby in effect to open the fluid circuit from the inlet 47 to the outlet 127 in which the vanes 34 are interposed. Thus, as the pressure fluid acts upon the selected faces of the vanes 34 as determined by delivery of the pressure fluid through either of the ports 59 or 62, fluid from the portions of the respective working chambers 32 and 33 at the opposite faces of the vanes 34 is displaced by the vanes by way of the respective selected exhaust port 128 or 129 past the associated exhaust control poppet valve 131 and thence port 152 and past the automatically pressure responsive check valve 147 out through the exhaust or outlet port 127. Oscillation of the piston 20 can, of course, be effected to the limits of oscillation defined by the vanes 34. Such oscillations are transmitted by the lever or other mechanism attached to the end 21 of the piston to the apparatus such as the steering motor of an airplane with which the control unit may be associated. As long as pressure fluid is active through the inlet port 47, selective oscillation of the piston 20 can be effected at will by turning of the shaft 107, and turning of the shaft will continue in the desired direction to the full turning limit or any fraction of the turning distance until the shaft 107 is returned to its neutral relation with respect to the rocker plate and the respective pressure fluid controlling poppet valve returns to closed condition.

More specifically, if the shaft 107 and the fork 95 are operated clockwise (Fig. 5) to move the pair of valves 64—131 open fluid is admitted to the hydraulically connected portions of the working chambers 32 and 33 and is exhausted from the opposite connected portions of the chambers 32, 33 by way of port 129 and the respectively connected passages. This causes the vanes to be driven clockwise to thereby drive the rotary piston 20 in similar direction. Upon cessation of movement of the shaft 107 and the fork 95, the valves 64 and 131 still being in the open positions thereof, the vanes 34 continue with a slight follow-up movement until the plate 85 returns to neutral position relative to the then stationary fork 95 and stem 107 and the valves 64, 131 return to closed position, closing the fluid circuit and bringing the vanes 34 to a halt. Turning of the shaft 107 counterclockwise, and thus movement of the fork 95 counterclockwise, effects opening of the companion valves 63, 131 for reverse movement of the vanes 34 and the rotary piston 20, from the movement just described, with automatic stopping of the piston in the same manner when the shaft 107 comes to a halt.

Figure 12:
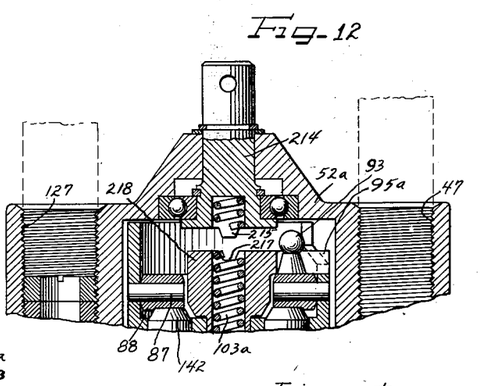
Figure 12 is a fragmentary, longitudinal, sectional view taken in substantially the same plane as Figure 1 but showing modified structure for actuating the main control valve mechanism.

In the preferred form of the invention as shown in Figure 1, it will be apparent that since the valve operating shaft 107 is at all times spline coupled with the poppet valve plug 52 through the fork head 98, in the manner hereinbefore described, the cockpit control may at all times indicate the precise angular position of the airplane wheel with which the unit is associated. This is of important advantage in permitting the pilot to observe at a glance the position of the wheel and if any adverse condition exists either for landing or for centering during strut retraction he can hydraulically correct the same. This desirable expedient is enhanced by the automatic realignment or centering of the valve controlling rocker fork 95 in its neutral or locked position within the confining notch 100 upon the discontinuance of live hydraulic pressure, the fork finding its locked position automatically under the influence of the return spring 103 and the guide provided by the cam surfaces 101 leading to the locking slot 100. This avoids any slight out of phase relationship that may exist in the pilot operated cockpit control and the steering motor following any steering activity.

Where it is desired to have a complete disconnection between the pilot control and the steering motor at the conclusion of steering activity, an alternate actuating structure such as shown in the modified embodiment of the invention disclosed in Figure 12 may be used. In this form, an actuating shaft 214 is freely rotatably mounted within the top closure of the head 52a and is formed with inner clutch teeth 215 adapted to engage within a notch or notches 217 in the upper normally spaced end of a vertically reciprocable head 218 which carries a fork 95a and is in other respects both structurally and functionally like the fork head of the preferred form of the invention hereinbefore described. The coiled expansion spring 103a normally urges the head 218 and the structure thereon downwardly into separated relation to the clutch face of the operating stem 214 and holds the fork 95a in its locked position. Upon the introduction of live pressure fluid into the steering motor, the fork-carrying head 218 is driven counter the bias of the spring 103a into clutching engagement with the clutch face of the shaft 214. If the clutch teeth 215 are out of phase with the slot 217, registration thereof can be effected by turning of the actuating shaft 214 until the teeth are aligned and clutched. In this form of the invention, of course, the cockpit controls will not indicate the angular position of the airplane except while the motor is under the influence of live hydraulic pressure fluid.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In combination in a device to be operated by hydraulic pressure fluid, means defining a fluid tight housing, means within said housing adapted to be actuated by the force of live pressure fluid, means for introducing the live pressure fluid into said housing, means affording an outlet for spent hydraulic fluid, a valve assembly including a plurality of poppet valves for controlling the passage of live pressure fluid from said inlet to said means to be actuated by the fluid and for controlling the displacement of the hydraulic fluid from said means to be actuated to said outlet, means for selectively actuating said poppet valves, said actuating means including a rocker plate having a ball arm extending therefrom and a fork engaging said arm and selectively swingable for rocking the arm and thereby rocking the plate, and means for shifting said fork into and out of a position wherein the fork is engageable with said rocker plate for holding the plate inactive.

2. In combination in structure for controlling a hydraulic fluid circuit, a plurality of reciprocable valve members, a rocker plate for actuating said valve members, and means for actuating said rocker plate including a member normally locking the rocker plate against rocking, and responsive to live hydraulic fluid pressure to be moved to non-locking, plate-actuating position.

3. In combination in a combined steering motor and shimmy damper, a cylinder, an oscillatory piston operatively mounted within said cylinder, means for delivering live hydraulic pressure fluid to the cylinder, means for controlling the delivery of the live hydraulic pressure fluid to the piston for alternatively driving the piston rotatably in opposite direction including a plurality of poppet valves and means for actuating said poppet valves, said actuating means including a separable clutch including a live pressure fluid actuated clutching member normally assuming a declutched position.

4. In combination in a hydraulic steering motor and shimmy dampener for airplane landing gear wheels and the like, a cylinder, an oscillatory piston in said cylinder and having a shaft extending from one end of the cylinder, means for delivering live hydraulic pressure fluid to the opposite end of the cylinder, means carried by the opposite end of the piston from said shaft for controlling the delivery of the live pressure fluid for actuating the piston and including a plurality of poppet valves and mechanism for actuating said poppet valves selectively, an outlet leading from the cylinder including a control valve normally closing the outlet but responsive to live pressure fluid to open the outlet, said outlet controlling valve having a replenishing fluid passage therethrough, and means at all times affording restricted communication for make-up fluid between said outlet and the interior of the cylinder by way of said passage.

5. In combination in a combined steering motor and shimmy damper unit a cylinder structure, a piston structure operative within said cylinder structure, means for delivering hydraulic pressure fluid to the cylinder structure for actuating the piston structure for steering purposes, means affording an outlet for displaced hydraulic fluid during steering operation, valve means for controlling the inlet and outlet means and adapted to close the same during non-steering intervals for maintaining a fluid-filled condition in the unit for shimmy dampening purposes, and means by-passing the outlet valve means in the closed condition of said valve means for replenishing the unit through said outlet means to compensate for shimmy dampening fluid losses.

6. In combination in a combined hydraulic steering motor and shimmy dampener of the character described, a cylinder structure, a piston operable within said cylinder structure, means for delivering hydraulic pressure fluid to the cylinder structure for actuating the piston, means providing an outlet for spent pressure fluid, and control valve structure for controlling said fluid delivery and outlet means for maintaining the cylinder filled with the hydraulic fluid upon discontinuance of the hydraulic pressure fluid supply so that the unit will continue functioning as a shimmy dampener, and means operative during the delivery of the pressure fluid supply for venting the unit of air.

7. In combination in a hydraulic steering motor and shimmy dampener unit, a cylinder structure, a piston structure operable in said cylinder structure, means for supplying hydraulic pressure fluid for actuating the piston structure for steering purposes, means providing an outlet for spent pressure fluid during steering, and valve mechanism for controlling both the fluid delivery and outlet means to afford a closed fluid-filled condition within the unit during non-steering intervals for operation of the piston for shimmy dampening, and means affording pressure release through said pressure fluid delivery means upon thermal expansion of the hydraulic fluid within the unit while the unit is serving merely as a shimmy dampener.

8. In combination in a combined hydraulic steering motor and shimmy dampener unit, a cylinder structure, a vaned piston operable in said cylinder structure and affording working chambers therein, means for supplying hydraulic pressure fluid to the working chambers for actuating the piston oscillatably for steering purposes, means affording an outlet for spent pressure fluid, valve mechanism for controlling the fluid delivery and the outlet means and operable during non-steering intervals to close the unit to afford a hydraulic fluid filled shimmy dampener, said piston having displacement passages therethrough for displacement of fluid within the working chambers during shimmy dampening, and live pressure fluid responsive valve means for closing said passages against said shimmy displacement of fluid during operation of the unit as a steering motor.

9. In combination in a hydraulic steering motor and shimmy dampener unit, a cylinder structure, closures for the opposite ends of the cylinder structure, diametrically opposite abutment vanes within the cylinder structure, an oscillatory vaned piston within the cylinder structure and cooperating with said abutment vanes to provide working chambers, means for supplying live pressure fluid to said chambers for actuating the piston for steering purposes, valve means for controlling said pressure fluid delivery means to maintain the working cylinders filled with hydraulic fluid during non-steering intervals when the delivery of hydraulic pressure fluid is discontinued, cross passages in said piston for balanced delivery of hydraulic pressure fluid during steering operations, said piston having orifices therein affording communication between said passages for hydraulic fluid displacement during shimmy dampening operations of the unit, pressure fluid responsive valve means for closing said orifices during steering motor operations of the unit and adapted to open automatically upon discontinuance of the pressure fluid supply, and metering valve structure for controlling resistance to displacement flow through said orifices.

10. In combination in a hydraulic steering motor and shimmy dampener unit, a cylinder structure, an oscillatory piston within said cylinder structure, a shaft on said piston extending from one end of the cylinder structure, a closure member disposed at one end of the cylinder structure through which the shaft extends, a relatively thin closure member for the opposite end of the cylinder structure, means for securing said thin closure member in place, means for delivering live hydraulic pressure fluid through said securing means to said cylinder for actuating said piston, and means for substantially equalizing the live hydraulic fluid pressure on opposite sides of said thin closure member.

11. In combination in a hydraulic steering motor and shimmy dampener unit, a cylinder structure, a piston structure operable in said cylinder structure, one end of said piston structure having a shaft extending from one end of the cylinder structure, the opposite end of the piston having a plug structure mounted therein and supporting a control valve structure, means for supplying hydraulic pressure fluid through said control valve structure to the cylinder structure for operating the piston, and means for controlling said valve structure exteriorly of the unit cooperatively related to said plug structure, said piston structure having displacement flow controlling valve means therein, said plug-carried valve structure being responsive to live hydraulic pressure fluid to act with said displacement valve means for controlling fluid displacement while the unit is subjected to live fluid pressure.

12. In combination in a hydraulic pressure fluid controlled steering motor, a housing providing a cylinder, an oscillatory vaned piston operable in said cylinder, said piston including a control valve-carrying extension at one end thereof and oscillatable with the piston, means surrounding said extension and including pressure fluid supply and exhaust fluid passages, said extension and said piston having intercommunicating passages between said supply and exhaust passages and the interior of the cylinder for operation of the piston, respective valves carried by said extension for controlling flow of fluid through said intercommunicating passages, a valve controlling rocker plate pivotally carried by the outer end portion of said extension and thereby oscillatable with the extension, a rocker plate actuating member carried by said extension and mounted for oscillation relative to the extension, and means for oscillatably actuating said rocker plate actuating member relative to said extension for rocking the rocker plate to actuate said control valves.

13. In combination in a combined hydraulic steering motor and shimmy dampener unit, a cylinder structure, a vaned piston operable in said cylinder structure and affording working chambers therein, means for supplying hydraulic pressure fluid to the working chambers for actuating the piston oscillatably for steering purposes, means affording an outlet for spent pressure fluid, valve mechanism for controlling the fluid delivery and the outlet means and operable during non-steering intervals to substantially close the unit to afford a hydraulic fluid filled shimmy dampener, means for operating said valve mechanism including spring means for normally biasing the same into inactive condition and a fluid responsive plunger operable to overcome the spring means, said piston having displacement passages therethrough for displacement of fluid within the working chambers during shimmy dampening, and live pressure-fluid-responsive valve means for closing said passages against said shimmy displacement of fluid during operation of the unit as a steering motor, said fluid-responsive valve means including a pressure-sensitive plunger operatively aligned with said first mentioned plunger, said fluid supplying means having a by-pass passage therefrom for delivering live pressure fluid for actuating said plungers simultaneously.

14. In combination in a combined hydraulic steering motor and shimmy damper unit, a cylinder structure, a vaned piston operable in said cylinder structure and affording working chambers therein, means for supplying hydraulic pressure fluid to the working chambers for actuating the piston oscillatably for steering purposes, means affording an outlet for spent pressure fluid, valve mechanism for controlling the fluid delivery and the outlet means and operable during non-steering intervals to close the unit to afford a hydraulic fluid filled shimmy damper, means for operating said valve mechanism normally spring biased into non-operating position and including a pressure-sensitive plunger, and means providing a live pressure fluid by-pass from said pressure fluid supplying means to supply live pressure fluid for actuating said plunger.

15. In combination in a combined hydraulic steering motor and shimmy damper unit, a cylinder structure, a vaned piston operable in said cylinder structure and affording working chambers therein, means for supplying hydraulic pressure fluid to the working chambers for actuating the piston oscillatably for steering purposes, means affording an outlet for spent pressure fluid, respective poppet valves carried by said piston for controlling the fluid delivery means and the outlet means, respectively, and operable during non-steering intervals to close the unit to afford a hydraulic fluid filled shimmy damper, each of said poppet valves having a piston-type base and said piston having cylindrical guides in which said bases are reciprocably slidable, said piston having displacement passages therethrough for displacement of fluid within the working chambers during shimmy dampening, and a valve for closing said passages against said shimmy displacement of fluid during operation of the unit as a steering motor, said valve having a stem extending therefrom and a live pressure-fluid-responsive piston head on said stem, said vaned piston having cylindrical guides for said last mentioned valve and said piston head, the space behind said base of the poppet valve controlling the fluid delivery means being ported for pressure relief to the space between the displacement passage closing valve and the piston head thereon and said last mentioned space being vented to the space behind the piston base of the poppet valve controlling said outlet means, said base of the poppet valve controlling the outlet means being vented for pressure relief to said outlet means.

16. In combination in a hydraulic steering motor unit of the character described, a casing defining a cylinder and having closures at the opposite ends thereof, an oscillatory vaned piston in said cylinder and having a shaft extending through one of the end closures, means in the opposite end closure defining pressure fluid inlet passage and separate fluid outlet passage, a separate plug body carried by the opposite end portion of the piston and secured for oscillation with the piston, said plug body extending beyond said opposite end of the piston, said opposite end closure providing a sliding bearing for the projecting portion of said plug body, said plug body having fluid communication passageways therethrough to provide communication between said inlet and outlet means and the interior of the cylinder, valves carried by said plug body for controlling said passageways, means for operating said valves carried by the outer end portion of said plug body, and means for actuating said valve operating means including a stem projecting from said opposite end closure.

HARRY L. CHISHOLM, Jr.
GEORGE FARRELL.
BERNARD E. O'CONNOR.

(References on following page)

REFERENCES CITED

The following references are of record in the file of this patent:

UNITED STATES PATENTS

| Number | Name | Date |
|---|---|---|
| 821,398 | Bergesen | May 22, 1906 |
| 1,078,305 | Ogle | Nov. 11, 1913 |
| 1,486,304 | Ross | Mar. 11, 1924 |
| 1,682,888 | Craig | Sept. 4, 1928 |
| 1,710,399 | Banning | Apr. 23, 1929 |
| 1,863,068 | Pippy | June 14, 1932 |
| 1,876,104 | Tucker | Sept. 6, 1932 |
| 2,030,902 | Vickers | Feb. 18, 1936 |
| 2,246,667 | Colman | June 24, 1941 |
| 2,275,963 | Herman | Mar. 10, 1942 |
| 2,293,555 | Mercier | Aug. 18, 1942 |
| 2,305,042 | Thacker | Dec. 15, 1942 |
| 2,364,659 | Ray | Dec. 12, 1944 |
| 2,372,710 | Chisholm | Apr. 3, 1945 |
| 2,376,804 | Orshansky | May 2, 1945 |
| 2,383,773 | Chisholm | Aug. 28, 1945 |

FOREIGN PATENTS

| Number | Country | Date |
|---|---|---|
| 373,732 | Great Britain | June 2, 1932 |